(12) United States Patent
Fuchs et al.

(10) Patent No.: US 8,952,597 B2
(45) Date of Patent: Feb. 10, 2015

(54) METHOD FOR OPERATING AN OUTPUT STAGE FOR AT LEAST ONE PIEZOACTUATOR

(75) Inventors: Stefan Fuchs, Stuttgart (DE); Marco Graf, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 550 days.

(21) Appl. No.: 13/138,397

(22) PCT Filed: Jan. 5, 2010

(86) PCT No.: PCT/EP2010/050034
§ 371 (c)(1),
(2), (4) Date: Oct. 19, 2011

(87) PCT Pub. No.: WO2010/094516
PCT Pub. Date: Aug. 26, 2010

(65) Prior Publication Data
US 2012/0032556 A1    Feb. 9, 2012

(30) Foreign Application Priority Data
Feb. 23, 2009 (DE) .......................... 10 2009 001 077

(51) Int. Cl.
*H01L 41/09* (2006.01)
*H02N 2/06* (2006.01)
*F02D 41/20* (2006.01)

(52) U.S. Cl.
CPC ............ *H02N 2/067* (2013.01); *F02D 41/2096* (2013.01)
USPC ...................................... 310/317; 310/316.03

(58) Field of Classification Search
CPC .............. H01L 41/042; F02D 41/2096; F02D 2041/2003; H02N 2/025; H02N 2/14
USPC ............................................... 310/316.03, 317
See application file for complete search history.

(56) References Cited

U.S. PATENT DOCUMENTS

| | | | |
|---|---|---|---|
| 6,271,618 B1 * | 8/2001 | Hoffmann et al. ........ | 310/316.03 |
| 6,292,345 B1 | 9/2001 | Müller et al. | |
| 7,528,524 B2 * | 5/2009 | Rueger et al. ............ | 310/316.03 |
| 8,525,488 B2 * | 9/2013 | Fuchs et al. ................... | 320/166 |
| 2007/0290573 A1 * | 12/2007 | Sykes et al. .................... | 310/311 |
| 2010/0045244 A1 * | 2/2010 | Fuchs et al. ................... | 320/166 |

FOREIGN PATENT DOCUMENTS

| | | |
|---|---|---|
| CN | 1234912 | 11/1999 |
| CN | 1938509 | 3/2007 |
| DE | 10 2007 014 326 | 10/2008 |
| EP | 1 860 307 | 11/2007 |
| EP | 1 923 559 | 5/2008 |
| WO | WO 99/17009 | 4/1999 |
| WO | WO 2008/116749 | 10/2008 |

\* cited by examiner

*Primary Examiner* — Thomas Dougherty
*Assistant Examiner* — Bryan Gordon
(74) *Attorney, Agent, or Firm* — Kenyon & Kenyon LLP

(57) ABSTRACT

A method for operating an output stage for a piezoactuator includes checking, during an operating phase, in response to the undershooting of a current for the piezoactuator below a setpoint current, whether a point in time for the undershooting lies outside or within a time window. A subsequent current pulse is controlled via the setpoint current if the point in time is located outside the time window, and the subsequent current pulse is controlled via a turn-on time if the point in time is located within the time window.

11 Claims, 3 Drawing Sheets

METHOD FOR OPERATING AN OUTPUT STAGE FOR AT LEAST ONE PIEZOACTUATOR

BACKGROUND OF THE INVENTION

1. Field of the Invention

The present invention relates to a method for operating an output stage for at least one piezoactuator, a system for operating an output stage for at least one piezoactuator, a computer program and a computer program product.

2. Description of Related Art

In control units for so-called common-rail injection systems or CR piezo systems (DS) and direct gasoline injection systems or BDE Piezo Systems (GS), which include piezoactuators for acting on cylinders, based on systems-conditioned requirements of a cylinder selection (cylinder-select), at different times at the end of a charging or discharging process, switching off takes place. In BDE Piezo Systems, the cylinder-select is switched off exactly after the end of the charging and discharging time. This takes place independently of whether at that time there is still energy left in a transfer inductance of a piezo output stage. In CR Piezo Systems, after reaching the switch-off criterion, which is determined by the time during charging and the voltage during discharge, the cylinder-select is first switched off as soon as there is almost no energy left in the transfer inductance. For BDE-Piezo Systems it is usually provided for drive circuits that a charge is linearly applied to the piezoactuator. For this purpose, the cylinder-select is switched off immediately after reaching the switch-off criterion, such as the charging time, which is unfavorable, however, for maintaining the requirements with respect to electromagnetic compatibility (EMC) of an output stage of a control unit.

A method and a device for charging a capacitive element are known from published German patent application document DE 10 2007 014 326.

BRIEF SUMMARY OF THE INVENTION

The present invention relates to a method for operating an output stage for at least one piezoactuator, which is assigned to a cylinder and is developed for actuating a valve element of this cylinder. In the method, during an operating phase, when the current flowing through the piezoactuator undershoots a setpoint current, it is checked whether a point in time for the undershooting lies outside or within a time window. As a function of whether the point in time lies, with respect to its position and/or its beginning, within a typically defined time window, a criterion is provided for an end of the operating phase. If the point in time is located outside the time window, the operating phase is continued and a subsequent current pulse or current impulse is controlled via the setpoint current. The subsequent current pulse is alternatively controlled via a turn-on time, if the point in time is located within the time window. In this case, the current operating phase is ended, so that a new operating phase may begin, in which a new setpoint current is typically supplied. The number of current pulses naturally depends on the operating point selected.

Independently of when the operating phase is ended, a charge is linearly applied to the piezoactuator, using the current. If the point in time is within the time window, and a normally time-controlled current pulse is ended in response to undershooting the zero current limit, it is also possible that a check-back signal is also switched off. Furthermore, a cylinder-select switch may be switched analogously to this check-back signal. In this context, perhaps several time-controlled current pulses, whose number is able to be defined in a fixed manner, may also be dispatched. In addition, in the subsequent operating phase, a further piezoactuator, that is assigned to a further cylinder, may have current applied to it.

The time window normally lies at the end of an operating time of the operating phase. The time window has a length of 0 to 25 µs as a function of the operating phase.

In one variant, the turn-on time is a function of a time interval that is established by the point in time for undershooting the time window and the end of the time window, or a point in time at which the time window is ended, as a rule.

The length of the time window is specified to an application-specific integrated circuit, which may be situated within a control unit, via a serial peripheral interface.

The method may be carried out for an operating phase developed for a charging phase, in which the piezoactuator is charged and/or for an operating phase developed as a discharge phase, in which the piezoactuator is discharged.

The present invention also relates to a system for operating an output stage for at least one piezoactuator. In this context, the system is developed to measure a current supplied to the piezoactuator during an operating phase of the output stage, and to check at which point in time the current undershoots a setpoint current, and whether this point in time lies outside or inside a time window. The system is also developed to continue the operating phase and to control a subsequent current pulse or current impulse via the setpoint current, if the point in time is outside the time window. In addition, the system is developed to control the subsequent current pulse alternatively via a turn-on time, if the point in time lies within the time window.

The system may have at least one measuring module for measuring the current, at least one test module for checking whether the point in time lies inside or outside the window, as well as at least one switching module for the current-controlled or time-controlled switching of the current, and thus the current pulse.

The system described is designed to execute all of the steps of the method introduced. Individual steps of this method are also able to be implemented by individual modules of the system. Furthermore, functions of the system, or functions of individual modules of the system, may be implemented as steps of the method. In addition, it is possible that steps of the method are implemented as functions of individual modules of the system or of the entire system.

In addition, the invention relates to a computer program having program code means for carrying out all of the steps of a described method, when the computer program is executed on a computer or a corresponding central processing unit, in particular in a system according to the present invention.

The computer program product according to the present invention, having program code means, which are stored on a computer-readable data carrier, is designed to execute all of the steps of a described method when the computer program is executed on a computer or a corresponding computing unit, in particular a system according to the present invention.

Using this invention, the procedures, which come into use in common-rail piezo systems (DS) and direct gasoline injection piezo systems (GS), are combined, so that cylinder-timing and control in time for the action of piezoactuator upon the cylinders of an internal combustion engine can be implemented. In this context, it is possible, among other things, to provide a linear application of the charge to the piezoactuator, without having a negative effect, in this instance, on the behavior with respect to the electromagnetic compatibility because of a high residual energy in a transfer inductance of the piezoactuator that is designed, for instance, as an inductor.

In one execution of the method, during at least one operating phase, which may be the charge phase and/or the discharge phase, at each undershooting of the current limit for a setpoint current $I_{setpoint}$, it is checked whether the point in time lies within a defined time window "T_window". The time window usually lies at the end of the charge phase or the discharge phase, and is specified via a serial peripheral interface (SPI) of an application-specific integrated circuit (ASIC) of the output stage. The window's length may have a value in the range of 0 to 25 ps, for example, which usually corresponds to circa 10%, with a maximum up to 25% of the overall length of the operating cycle which, as a rule, may last between 100 μs . . . 200 μs. The current provided for the piezoactuator usually has a substantially zigzag-shaped profile, so that, during one of the operating phases named, the current is able to undershoot the limits for setpoint current $I_{setpoint}$ perhaps several times, until the point in time for undershooting the setpoint current within the time window has been reached.

If the time window has not yet been reached at the checking time, the subsequent current pulse is controlled via setpoint current $I_{setpoint}$. As soon as the checking time is located within the time window, the subsequent current pulse is controlled via the turn-on time. The turn-on time is, among other things, a function of the time duration which extends from the point in time, as of which the current limit for setpoint current $I_{setpoint}$ is undershot, to the end of the time window, which at the same time corresponds to the end of the charge or discharge side. The farther the point in time for an undershooting of the setpoint current $I_{setpoint}$ is positioned away from the end of time window "T_window", the longer the turn-on time becomes, so that the turn-on time is able to be proportional to the time duration mentioned.

Because of this measure, it comes about that, using a longer or shorter charging time and discharging time, a correspondingly greater or lesser charge sets in on the piezoactuator, and, at the same time, the cylinder-select switch, analogously to the check-back signal, is always switched off only switched off at a defined, small residual energy in the transfer inductance or the inductance for acting upon the piezoactuator. In the design approach up to now, for common-rail injection piezo systems, there comes about, as a function of the point in time that establishes the end of the charge and discharge time, and the current curve, usually as a function of the point in time at which setpoint current $I_{setpoint}$ has been exceeded and a zero current limit has not been undershot, a so-called lag point, during which the applied charge is not changed compared to the previous working point, in spite of an extended or abbreviated charging and discharging time. This leads to a nonlinear relationship between the charge and discharge time and the applied and dissipated charge.

The method may be implemented, for instance, in a circuit (ASIC) for a DGS piezoactuator, and further used in all DS piezo systems for common-rail injection and GS piezo systems for direct gasoline injections.

Further advantages and embodiments of the present invention are derived from the description and the accompanying drawings.

It is understood that the features mentioned above and the features yet to be described below may be used not only in the combination given in each case but also in other combinations or individually, without departing from the scope of the present invention.

DETAILED DESCRIPTION OF THE INVENTION

Figure 1:
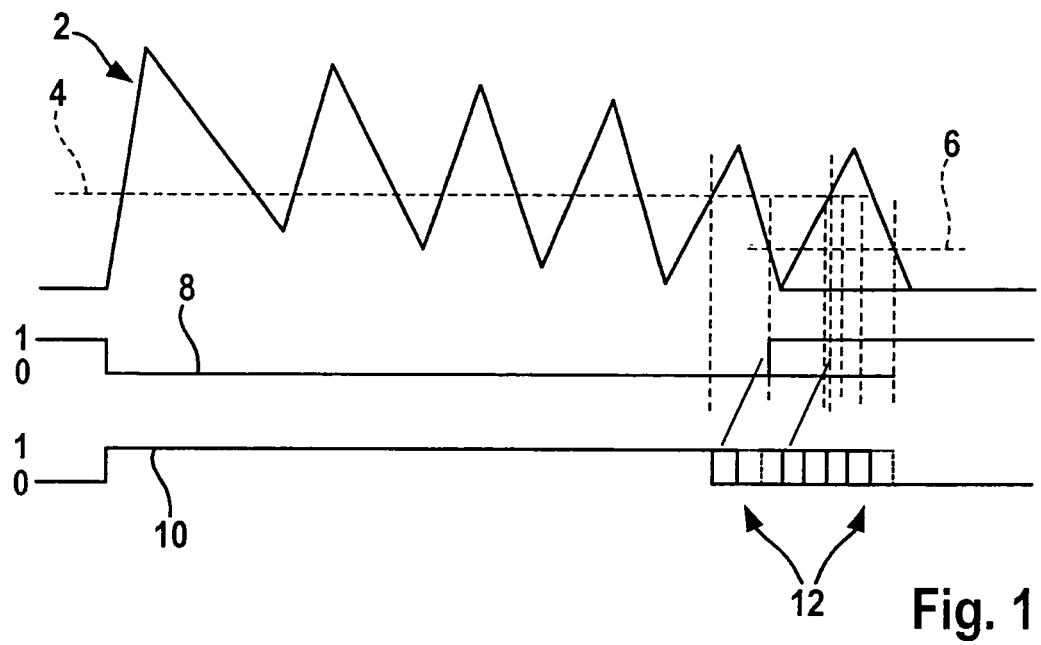
FIG. 1 shows in schematic representation a diagram having operating parameters which occur in the operation of a common-rail injection piezo system (DS).

In the figures the same reference numerals denote identical components.

FIG. 1 in a schematic representation shows a diagram having operating parameters for an example of a common-rail injection piezo device (CY 372 having PCP2 of the firm of Robert Bosch GmbH), having a plurality of overlapping curves for a current 2, which differ by the last current pulse, with reference to a setpoint current 4 and a zero current limit 6. Furthermore, in FIG. 1, a plurality of curves is shown for check-back signals 8 and control signals 10, respectively. A control signal 10 may have various lengths, which are shown in the diagram of FIG. 1 by the different broken lines for possible ends 12 of control signal 10. Current 2 is supplied to a piezoactuator, if control signal 10 is at value 1, and a corresponding check-back signal 8 is then at value 0. The direction of check-back signal 8 and of control signal 10 may be the other way around. In this case, check-back signal 8 is "low-active", which means that check-back signal 8 is active when it has the value 0, and it is not active when it has the value 1. In contrast, control signal 10, is "high-active", and accordingly control signal 10 is active when it has the value 1, and not active when it has the value 0. The charging phase and the discharging phase are not immediately ended with the falling side of control signal 10. A last current pulse is still executed before zero current limit 6 is undershot, and thus check-back signal 8 outputs a rising side. An acknowledgment is made to a controller by check-back signal 8. Control signal 10 defines the duration of an operating phase, as a rule, a charging phase and/or a discharging phase. Check-back signal 8 reports the actual duration back to a controller.

Because of this measure, the behavior with respect to the electromagnetic compatibility is favorably affected, since check-back signal 8 is only switched off, and thus the cylinder-select switch is also switched off, as soon as current 2 has undershot zero current limit 6, and has thus almost reached the value 0. In addition, a nonlinear relationship exists between the charging and discharging time and an applied and dissipated charge by the lag point during which setpoint current 4 $I_{setpoint}$ is exceeded at a last current pulse and zero current limit 6 has not been reached yet. One condition for the lag time is that setpoint current 4 $I_{setpoint}$ has been exceeded and the zero current limit has not yet been undershot. In the case of some broken line control signals 10 having different ends 12, the current curve does not change, i.e. no change in the charge comes about, in this instance.

Figure 2:
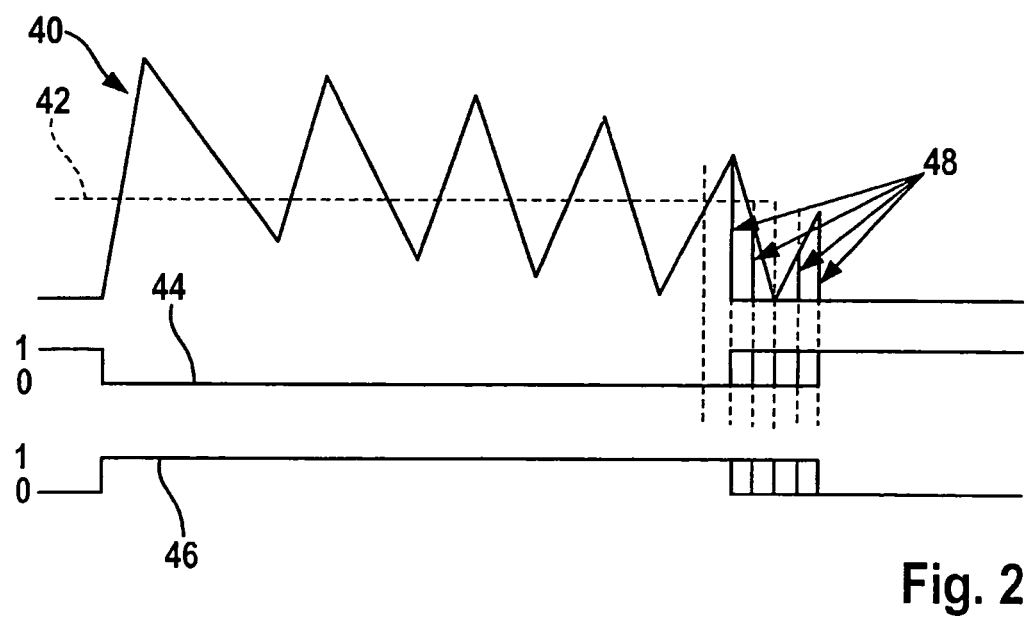
FIG. 2 shows in schematic representation a diagram having operating parameters which come about in the operation of a common-rail injection piezo device (GS).

FIG. 2 shows in a schematic representation a diagram having operating parameters for an example for a direct gasoline injection piezo device (GS piezo output stage and CJ 870) having a current curve 40 with reference to a setpoint current 42, $I_{setpoint}$, curves for a check-back signal 44 and a control signal 46, the piezoactuator being charged if control signal 46 is at level 1; and no charge taking place if control signal 46 is at level 0. The control signals 46 shown here begin at the same time and end at different times. If a curve for a control signal has the value 1 or 0, the associated check-back signal 44 has the value 0 or 1. Various opening points in time 48 for check-back signal 44 are indicated in the diagram.

In this context, there comes about a linear charge application as a function of the charge and discharge time. Immediately after the reaching of the charge and discharge time, check-back signal 44 is set at opening time 48 to not active, and at the same time the cylinder-select switch is opened. Depending on the switch-off time, there may still be residual energy in the transfer inductance. This leads to voltage jumps at high side lines of the piezoactuator, which are associated with an injector, which has a negative effect on the electromagnetic compatibility.

Figure 3:
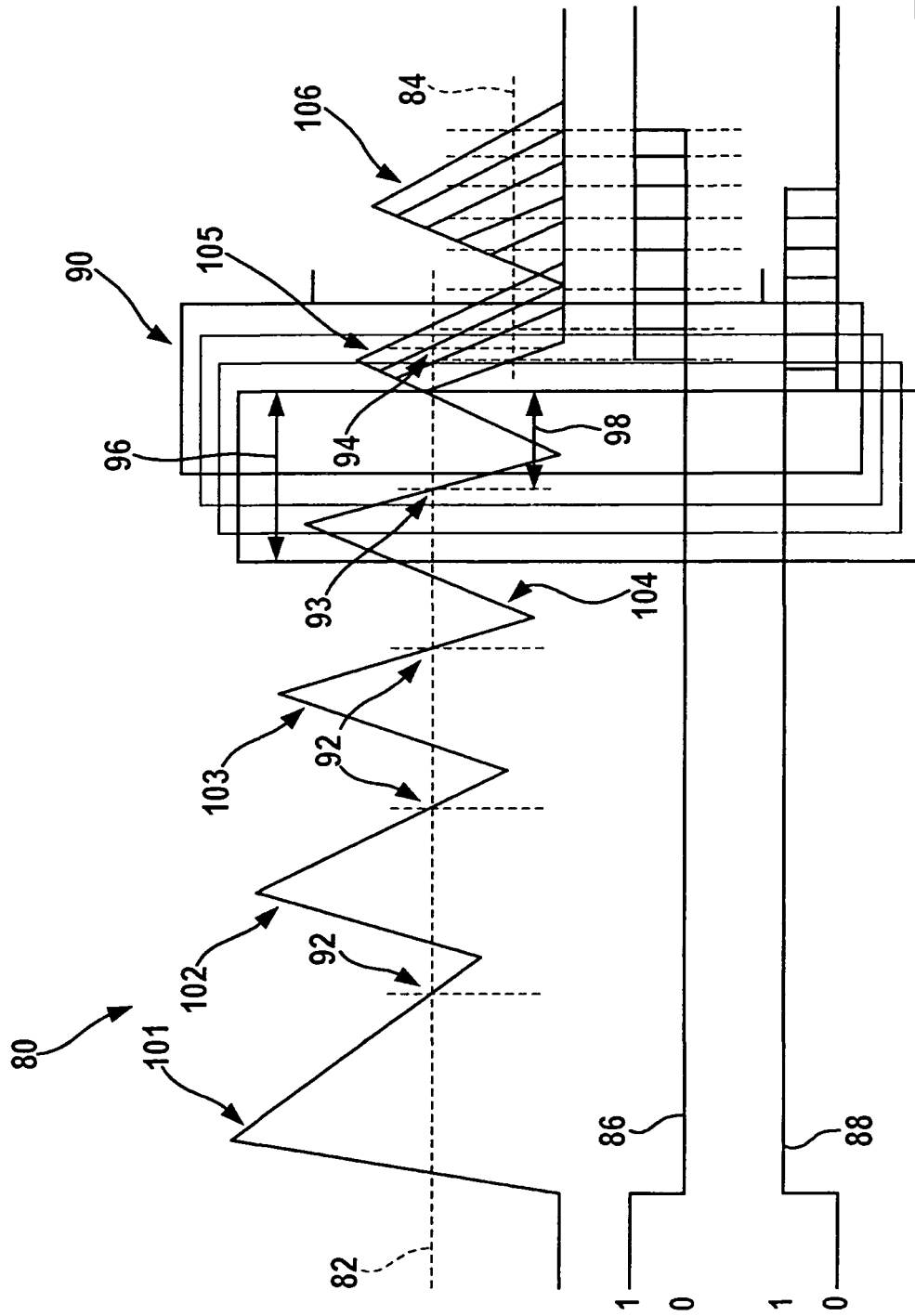
FIG. 3 shows a diagram for operating parameters which come about during the implementation of a specific embodiment of the method according to the present invention for a specific embodiment of a device according to the present invention.

FIG. 3, in schematic representation, shows a diagram for a possible specific embodiment of the method according to the present invention for implementing cylinder timings, or the timing control of a cylinder.

In the diagram of FIG. 3, a plurality of curves is shown, in an overlapping manner, in this case for a pulsed or clock-pulsed curve of a current 80 for a piezoactuator with reference to a setpoint current $I_{setpoint}$ 82 and a zero current limit 84. In this context, in the diagram, in the first processes (short control signals 88) for the curve of current 80, five current pulses 101, 102, 103, 104, 105 are indicated, the various processes differ in the length of current pulse 105 (the latter is controlled by different lengths of turn-on times: the turn-on time increases with increasing length of control signal 88). As soon as checking time 93 of current pulse 105 occurs outside the time window, an additional current pulse 106 is added. In this instance, the processes now differ by last current pulse 106. As soon as current pulse 106 occurs outside the time window, the preceding sequence repeats itself: An additional current pulse is added. The whole thing repeats itself until the control signal ends the process, and a last time-controlled current pulse is ended. The number of current pulses is a function of the length of control signal 88 and setpoint current limit 82.

The diagram of FIG. 3 also includes curves for a check-back signal 86 and a control signal 88. In this instance, a control signal 88 has associated with it a check-back signal 86 and a current 80, respectively. If a control signal 88 has the value 1, an associated check-back signal 86 has the value 0. If a check-back signal 86 has the value 1, an associated control signal 88 has the value 0. The direction of the check-back signal 86 and of the control signal 88 may also be reversed. In this case, check-back signal 86 is "low-active", which means that check-back signal 86 is active when it has the value 0, and it is not active when it has the value 1. In contrast, control signal 88, is "high-active", and accordingly control signal 88 is active when it has the value 1, and not active when it has the value 0. Moreover, in the diagram of FIG. 3, time windows 90 (T_windows) are shown, which begin at different points in time, in each case only one of the time windows 90 being active. In this diagram, a plurality of charging sides is shown for time window 90 one over another. Each charging side has a time window 90 and differently long side durations.

During the operating phase, which may be a charge and/or discharge phase of the piezoactuator, for pulsed or clock-pulsed current curve 80, at several points in time 92, 93, 94, setpoint current $I_{setpoint}$ 82 is undershot. Upon each under-shooting of setpoint current $I_{setpoint}$ 82 it is checked whether the point in time is located within time window 90 that is specified for this process at a length indicated by double arrow 96. Furthermore, a time interval is indicated by second double arrow 98, and from this time interval the turn-on time is ascertained for the time-controlled current pulse.

In the first processes (5 current pulses without current pulse 106), the first three current pulses 101, 102, 103 undershoot setpoint current 82 at one of the first three times 92 outside time window 90. In these cases, a subsequent fourth current pulse 104 is made available by current control to setpoint current $I_{setpoint}$ 82. Fourth current pulse 104 undershoots setpoint current $I_{setpoint}$ 82 at a fourth time 93, which is located within time window 90 (T_window), and in this case a subsequent, fifth current pulse 105 is appended. For this fifth current pulse 105, no further checking is done. A resolution of the turn-on time amounts to 125 ns at a system clock pulse of 8 MHz.

Figure 4:
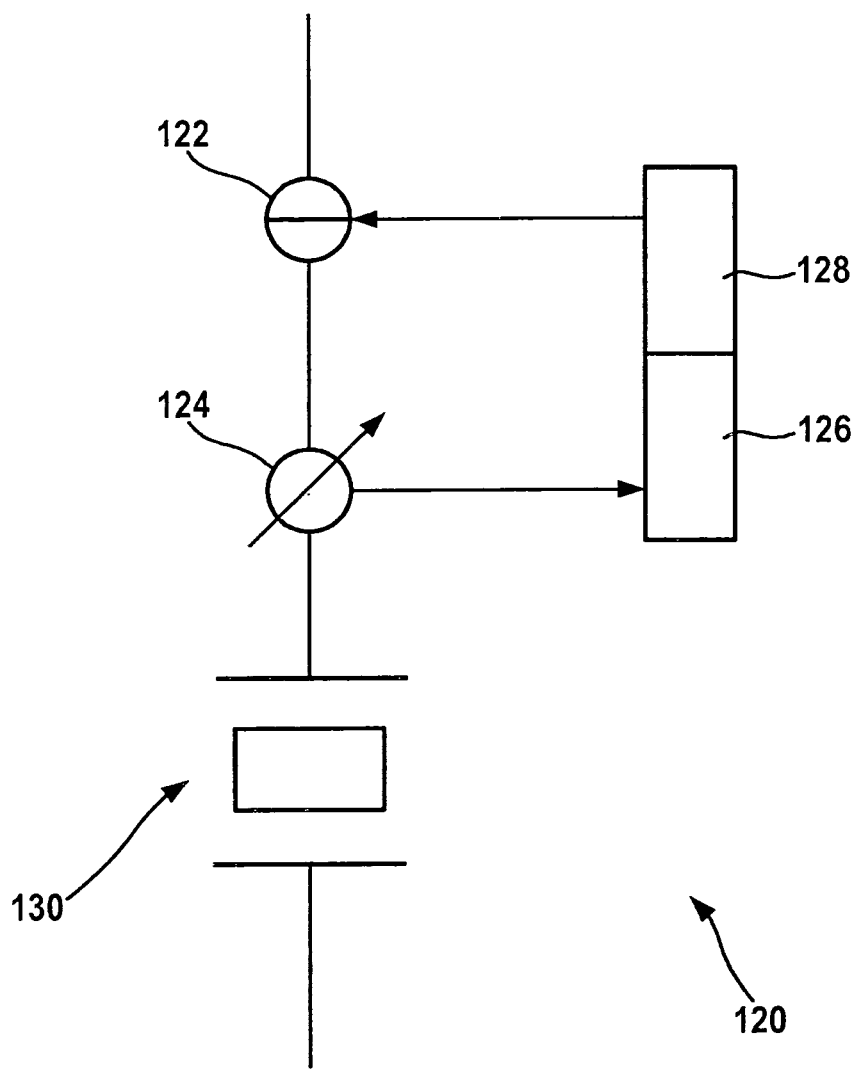
FIG. 4 shows a specific embodiment of a system according to the present invention in a schematic representation.

One specific embodiment of system 120 is shown in FIG. 4. This system includes a current source 122, a measuring module 124 developed as an ammeter, a test module 126 and a switching module 128. During the operation of a piezoactuator 130, current is supplied to the latter by current source 122. In a current operating phase, which may be a charge and/or a discharge phase of the piezoactuator, values of this supplied current are measured by measuring module 124 and are supplied to test module 126. It is checked by this test module 126 whether the current undershoots a setpoint current and whether a point in time for the undershooting lies outside or inside the specified time window. Depending on whether the point in time for the undershooting lies within or outside the time window, a time-controlled current pulse is appended, and subsequently the current operating phase is ended, if the point in time is located within the time window. The current, and consequently a subsequent current pulse continue to be controlled via the setpoint current if the point in time is located outside the time window. In this case, the current operating phase is continued.

What is claimed is:

1. A method for operating an output stage for at least one piezoactuator, comprising:
   detecting, during an operating phase, a current for the piezoactuator undershooting a predetermined setpoint current;
   checking, in response to the current for the piezoactuator undershooting the predetermined setpoint current, whether a point in time of the occurrence of the undershooting lies outside or within a predefined time window; and
   controlling a subsequent current pulse via the setpoint current if the point in time of the occurrence of the undershooting lies outside the predefined time window, and controlling the subsequent current pulse via a turn-on time if the point in time of the occurrence of the undershooting lies within the predefined time window.

2. The method as recited in claim 1, wherein a charge is linearly applied to the piezoactuator using the current for the piezoactuator.

3. The method as recited in claim 1, wherein a check-back signal is switched off and a cylinder-select switch is switched off if the point in time of the occurrence of the undershooting lies within the predefined time window, and wherein a time-controlled current pulse is ended in response to the undershooting of a predefined zero current limit.

4. The method as recited in claim 1, wherein the predefined time window lies at the end of an operating time of the operating phase.

5. The method as recited in claim 1, wherein the turn-on time is a function of a time interval beginning with the point in time of the occurrence of the undershooting of the predefined setpoint current and ending with the end of the predefined time window.

6. The method as recited in claim 5, wherein a length of the predefined time window is specified via a serial peripheral interface.

7. The method as recited in claim 5, wherein the operating phase is one of a charging phase or a discharging phase.

8. A system for operating an output stage for at least one piezoactuator, comprising:
- a measuring module that detects, during an operating phase, a current for the piezoactuator undershooting a predetermined setpoint current;
- a test module that checks, in response to the current for the piezoactuator undershooting the predetermined setpoint current, whether a point in time of the occurrence of the undershooting lies outside or within a predefined time window; and
- a switching module that controls a subsequent current pulse via the setpoint current if the point in time of the occurrence of the undershooting lies outside the predefined time window, and controlling a subsequent current pulse via a turn-on time if the point in time of the occurrence of the undershooting lies within the predefined time window.

9. A non-transitory computer-readable data storage medium storing a computer program having program codes which, when executed on a computer, performs a method for operating an output stage for at least one piezoactuator, the method comprising:
- detecting, during an operating phase, a current for the piezoactuator undershooting a predetermined setpoint current;
- checking, in response to the current for the piezoactuator undershooting the predetermined setpoint current, whether a point in time of the occurrence of the undershooting lies outside or within a predefined time window; and
- controlling a subsequent current pulse via the setpoint current if the point in time of the occurrence of the undershooting lies outside the predefined time window, and controlling the subsequent current pulse via a turn-on time if the point in time of the occurrence of the undershooting lies within the predefined time window.

10. A non-transitory computer-readable medium on which are stored instructions that are executable by a computer processor, the instructions which, when executed by the processor, cause the processor to perform a method for operating an output stage for at least one piezoactuator, the method comprising:
- detecting, during an operating phase, a current for the piezoactuator undershooting a predetermined setpoint current; and
- controlling a subsequent current pulse, wherein the instructions are configured to:
  - cause the processor to perform the controlling via the setpoint current conditional upon that a point in time of the occurrence of the undershooting lies outside a predefined time window; and
  - cause the processor to perform the controlling via a turn-on time conditional upon that the point in time of the occurrence of the undershooting lies within the predefined time window.

11. The non-transitory computer-readable medium as recited in claim 10, wherein the turn-on time is proportional to the distance of the point in time of the occurrence of the undershooting from an end of the predefined time window.

\* \* \* \* \*